United States Patent
Yi

(10) Patent No.: US 10,895,052 B2
(45) Date of Patent: Jan. 19, 2021

(54) DESERT OR SAND CONTROL METHOD

(71) Applicants: Zhijian Yi, Chongqing (CN); Chongqing Jiaotong University, Chongqing (CN)

(72) Inventor: Zhijian Yi, Chongqing (CN)

(73) Assignees: Zhijian Yi, Chongqing (CN); CHONGQING JIAOTONG UNIVERSITY, Chongqing (CN)

(*) Notice: Subject to any disclaimer, the term of this patent is extended or adjusted under 35 U.S.C. 154(b) by 0 days.

(21) Appl. No.: 16/327,677

(22) PCT Filed: Aug. 24, 2017

(86) PCT No.: PCT/CN2017/098860
§ 371 (c)(1),
(2) Date: Feb. 22, 2019

(87) PCT Pub. No.: WO2018/036546
PCT Pub. Date: Mar. 1, 2018

(65) Prior Publication Data
US 2019/0186096 A1 Jun. 20, 2019

(30) Foreign Application Priority Data
Aug. 25, 2016 (CN) .......................... 2016 1 0725079

(51) Int. Cl.
E02D 3/12 (2006.01)
A01C 21/00 (2006.01)
A01B 79/02 (2006.01)

(52) U.S. Cl.
CPC .............. *E02D 3/126* (2013.01); *A01B 79/02* (2013.01); *A01C 21/00* (2013.01); *A01C 21/002* (2013.01); *E02D 2300/0006* (2013.01)

(58) Field of Classification Search
CPC ................................ C09K 17/14; C09K 17/16
USPC ..................... 405/258.1, 263, 264, 270, 271
See application file for complete search history.

(56) References Cited

U.S. PATENT DOCUMENTS

| | | | | |
|---|---|---|---|---|
| 1,383,528 A * | 7/1921 | Clarke | ................... | A01B 39/08 172/543 |
| 3,640,021 A * | 2/1972 | Grafmuller | ............ | C09K 17/42 47/9 |
| 3,805,532 A * | 4/1974 | Kistner | ................... | C08G 18/10 405/264 |
| RE32,476 E * | 8/1987 | Kistner | .................. | C08G 18/10 405/264 |
| 5,125,770 A * | 6/1992 | Hesseling et al. | ........ | C08L 3/02 106/900 |
| 5,294,060 A * | 3/1994 | Thompson | ............ | A01C 15/02 222/145.7 |
| 5,846,601 A * | 12/1998 | Ritter et al. | ............. | C05G 3/04 427/221 |
| 6,675,529 B1 | 1/2004 | Petrea | | |
| 2003/0106261 A1 * | 6/2003 | Petrea et al. | ............. | C05G 3/04 47/58.1 SC |
| 2013/0097924 A1 * | 4/2013 | Thrash | ................... | C09K 17/42 47/58.1 SC |
| 2013/0145687 A1 * | 6/2013 | Cristobal et al. | ...... | C09K 17/52 47/58.1 SC |

FOREIGN PATENT DOCUMENTS

| | | |
|---|---|---|
| CN | 1314075 A | 9/2001 |
| CN | 102656971 A | 9/2012 |
| CN | 103348830 A | 10/2013 |
| CN | 103348831 A | 10/2013 |
| CN | 103348834 A | 10/2013 |
| CN | 103348835 A | 10/2013 |
| CN | 103348836 A | 10/2013 |
| CN | 103348837 A | 10/2013 |
| CN | 103650692 A | 3/2014 |
| CN | 103798006 A | 5/2014 |
| CN | 103814650 A | 5/2014 |
| CN | 106358482 A | 2/2017 |
| RU | 2567156 C1 | 11/2015 |
| WO | 2014/189473 A1 | 11/2014 |

OTHER PUBLICATIONS

The State Intellectual Property Office of People's Republic of China: First Office Action issued in CN Application No. 201610725079.3 dated Feb. 11, 2018; 20 pages including English translation.
Yi et al., "Why can soil maintain its endless eco-cycle? The relationship between the mechanical properties and ecological attributes of soil" Science China; Oct. 2016; vol. 59, No. 10; 3 pages.
Yi et al., "Desert Soilization: An Eco-Mechanical Solution to Desertification" Engineering 2 (2016) 270-273.

* cited by examiner

*Primary Examiner* — Tara Mayo-Pinnock
(74) *Attorney, Agent, or Firm* — Schwabe Williamson & Wyatt, PC

(57) ABSTRACT

This invention discloses a method for treating sand or sandy soil in desert or desertified land, comprising spreading water and a solid organic substance in any order or by directly spreading an adhesive and cohesive solution containing the solid organic substance onto the surface of desert or desertified land, and then stirring the solution containing the solid organic substance or mixing water and the solid organic substance with sand on the surface of desert or desertified land in a uniform way by a stirring device to finally form a modified sand material. This sand treatment method can be directly implemented on the surface of desert or desertified land without transporting and discharging the mixture onto the surface of desert or desertified land, and thus saving cost and time.

7 Claims, No Drawings

DESERT OR SAND CONTROL METHOD

This application is a US National Phase application based upon PCT Application No. PCT/CN2017/098860, filed Aug. 24, 2017, which claims the priority of Chinese Patent Application No. 201610725079.3, filed on Aug. 25, 2016, and the disclosures of which are hereby incorporated by reference.

FIELD

This invention relates to a method for treating sand or sandy soil in desert or desertified land.

BACKGROUND

Desert and desertification are among the most serious environmental problems on earth at present. Desertification leads to the "degradation" or "sandification" of the soil, making the soil a "desert" or "sandy land" or "sand soil" dominated by sand (the sand soil also includes other naturally occurring, mainly sand-based soil type). The hazards of desertification and sandification include the cover of land by moving sand dunes, the blockage of rivers, reservoirs, water channel and road, etc., and also the degradation of the entire ecosystem, the loss of land resources, the regional economic lag caused by the combination and also social-economic problems such as social instability. The rapid expansion of desert and desertification has encroached upon the limited land resources. They led the natural fertile soil to degrade, damaged the soil structure and caused the loss of soil nutrients. However, it usually takes tens, hundreds and even thousands of years for soil to recover its fertility in a natural way. If the existing methods are used to restore soil fertility, the amount of input required is huge and difficult to calculate.

In general, the prevailing desert and desertification control methods are grouped into three types: engineering (mechanical) method, vegetation method and chemical method. The engineering and vegetation methods aim to slow down the wind speed and consequently the sand drifting speed, while the chemical method is, by spreading a chemical substance onto the surface of desert or desertified land, to control the development of wind erosion process on sand surface. The existing mechanical equipment for desert and desertification control is usually used in chemical method for sand-fixing, after the chemical substance is infiltrated into the sand to form a hard sand layer on the surface of desert or desertified land, the drifting sand is fixed and thus the damage caused by sand is controlled.

Chinese patents "Modified Sand Material" (ZL 2013102233"90.4), "Method for Producing Modified Sand Material" (ZL 201310224659.0) and "Method for Treating Sandy Soil by Modified Sand material (ZL 201310224654.8) have disclosed a modified sand or sandy soil which possesses the mechanical properties, ecological attributes, air permeability as well as the capacities to retain water, nutrients and air and to grow micro-organisms as the natural fertile soil. Modification or "soilization" of sand or sandy soil is able to control sand or sandy soil from drifting away and the modified or "soilized" sand or sandy soil is able to retain water and nutrients, making it more suitable for the growth of plants, so the problem of desert and desertification can be controlled fundamentally.

The above patents are with the characteristics being as follows: the modified sand is formed by mixing sand or sandy soil with an adhesive and cohesive solution obtained by dissolving a water-soluble solid organic substance into water; the said adhesive and cohesive solution, after being mixed with sand or sandy soil, can bind the sand or sandy soil granules together, and thus forms a modified sand material with a porous structure; the water in the adhesive and cohesive solution is reserved between the sand or sandy soil granules with the solution; after the evaporation of the water in the adhesive and cohesive solution, the water-soluble solid organic substance among the sand or sandy soil can bind together the sand or sandy soil granules, and can dissolve into water again when it encounters water, and thus forms the adhesive and cohesive solution again and binds together the sand or sandy soil granules.

After evaporation of the water in the adhesive and cohesive solution, the water-soluble solid organic substance among the sand or sandy soil can bind together the sand or sandy soil granules; after the evaporation of the water in the adhesive and cohesive solution, the weight ratio between the remained solid organic substance and the sand or sandy soil is between 1:30-8000.

Furthermore, both closed and interconnected pores exist among the sand or sandy soil granules of the modified sand material. The water-soluble solid organic substance comprises at least one of natural polymer, modified natural polymer and synthetic polymer.

And at least one of organic macromolecular additive, small molecule additive, surfactant, inorganic reactive powder/particulate substance, inorganic non-reactive powder/particulate substance, solid substance and pH adjusting agent may be further added into the solution.

The water-soluble solid organic substance comprises at least one of polyvinyl alcohol, polyoxyethylene, polyethylene glycol, sodium polyacrylate, sodium carboxymethyl cellulose, hydroxypropyl methyl cellulose, cellulose ether, and a copolymer thereof.

The disclosures of above patents are able to soilize sand or sandy soil in principle so as to control desert and desertification fundamentally.

In mechanical properties, sand or sandy soil is a granular material. As its dominant content is sand granules, in mechanics it exists in a "discrete" state characterized by being drifty and so it is instable to support plant roots. However, soil exists in two states: in a rheological state when it is wet and in a solid state when it is dry, and the two states can readily transform into each other, i.e., the rheological state will transform into the solid state after water in it evaporates or the solid state will turn into the rheological state after it absorbs water. In both rheological state and solid state, soil is not drifty and can provide steady support for plant roots.

In a discrete state, the constraint among the sand or sandy soil granules is "contact" constraint and only two constraint reactive forces are produced: contact pressure and friction, so the discrete sand or sandy soil is drifty, liable to collapse and thus instable to support plant roots. The typical characteristic of a granular material in the discrete state is that, there is a limit slope at the time of accumulation, called the critical angle of repose. Once an adhesive and cohesive solution is added to the sand or sandy soil, the omni-directional integrative constraint (or "binding constraint") will form among the sand or sandy soil granules, so the sand or sandy soil will turn from the discrete state into the rheological state. The omni-directional integrative constraint (later called the ODI constraint) can not only produce contact pressure and friction, but also tension and moment to bind the granules together, and it also has omni-directionality and restorability. The granular material in the rheological state is flexible in granular arrangement and can be reshaped or remolded into any shape: any two masses can be integrated into one mass and any one mass can be re-divided into two masses as that of wet soil.

When the ODI constraint among the sand or sandy soil granules turns into the "fixed" constraint, the granular material will turn into a solid state. As the fixed constraint will produce constraint reactive forces to restrain the granular rearrangement, the granular material in the solid state cannot change its shape, so its granular arrangement is fixed, and once the granular arrangement is changed, it means cracking or break as what occurs to the dry soil. The mechanical property of solid state is characterized by strength.

Due to the repeatedly water-soluble nature of the solid organic substance (such as CMC) added to the sand or sandy soil in the above patents, when CMC in the dry "soil" absorbs water again, the fixed constraint among the granules will turn into the ODI constraint, so the "soil" in the dry, solid state can turn back to the wet, rheological state.

The eco-mechanical attributes of "self-repair" and "self-regulation" of soil are determined by its mechanical properties of ready transition between the rheological state and the solid state.

The modified (soilized) sand material in the above patents possesses the "self-repair" attribute of natural soil. "Self-repair" implies that soil can repair its crack or damage which suffers in the solid state by returning to the rheological state (absorbing water). The eco-mechanical attribute of "self-repair" can explain the long-standing mystery of why soil can maintain its endless eco-cycle. Why can soil maintain its endless eco-cycle? Because soil can readily transition between the rheological state and solid state year after year, i.e., soil granules can constantly transform between the "gentle" ODI constraint and "hard" fixed constraint. Otherwise, soil will not remain to be soil any longer. Without the "self-repair" attribute, soil will undergo two extreme scenarios. One is that the constraint among the soil granules will become so strong that soil will be hardened; the other is that the constraint among the soil granules will be weakened until no more tension exists among the soil granules and only "contact" constraint remains, which signifies that finally the soil is "desertified". Either the hardened or desertified soil is not favorable for plant growth in it.

The eco-mechanical attribute of "self-regulation" only exists when the soil is in a rheological state. This attribute is determined by the ODI constraint among the granules. The modified sand or sandy soil in this invention possesses the "self-regulation" attribute of natural soil. "Self-regulation" has two implications. One is that the granular arrangement among the soil granules is flexible; the other is that there always exists a binding force among the soil granules. Even when any kind of modified sand or sandy soil in the rheological state is mixed with another and its granular arrangement is changed, the newly-formed modified sand or sandy soil will still exist in a rheological state and there will still exist a binding force among the granules, and the constraint among the granules is still characterized by omni-directionality and restorability.

Theory and practice have shown that soil is a favorable habitat for plants, with the following characteristics: it is rheological when wet and solid when dry; its ecological attributes including the eco-mechanical attributes are self-repair and self-regulation as well as the capacities to retain water, nutrients and air. Such a habitat can be man-made! The "soil" modified from sand and sandy soil possesses the same mechanical properties and ecological attributes of natural soil, and therefore, it is in essence the same as natural soil as they are both favorable habitats for plants. This is the theoretical basis of desert "soilization" and also where the inventiveness and creativeness of this invention lies.

The above-mentioned modified sand material provides a general method for controlling desert or desertification. While implementing, conventionally a special container is used to mix water and the solid organic substance with sand, and then to transport, discharge and lay the mixture onto the surface of desert or desertified land, which is inefficient and not applicable for large-scale mechanized desert soilization. Thus, a new, innovative method is needed to carry out large-scale desert soilization. Thus, a new method is needed to implement large-scale soilization of sand or sandy soil in desert or desertified land, by which the organic substance directly spread onto the surface of desert or desertified land and then mix with sand or sandy soil on the surface of desert or desertified land so that lame-scale mechanized desert soilization is made possible. The modified sand or sandy soil will become as stable, water-retaining and air permeable as natural soil and also has the capacities to retain nutrients; sowing and planting will be carried out in the modified sand or sandy soil. Thus, the problem that sand is liable for drifting and difficult to retain water and nutrients will be resolved, and so desert and desertification will be treated effectively on a large scale by mechanical means.

SUMMARY

Based on the principle of the formation of modified sand material, this invention aims to provide a new method to implement large-scale soilization of sand or sandy soil in desert or desertified land. This method is able to directly spread the organic substance onto the surface of desert or desertified land and then to mix with sand or sandy soil on the surface of desert or desertified land so that large-scale mechanized desert soilization is made possible; the modified sand or sandy soil will become as stable, water-retaining and air permeable as natural soil and also has the capacities to retain nutrients; sowing and planting will be carried out in the modified sand or sandy soil. Thus, the problem that sand is liable for drifting and difficult to retain water and nutrients will be resolved, and so desert and desertification will be controlled effectively.

This invention provides a method for treating sand or sandy soil in desert or desertified land which comprises the following steps (hereinafter referred to as M1):

a) spreading water onto the surface of the desert or desertified land;

b) spreading a solid organic substance onto the surface of the desert or desertified land;

c) stirring water, the solid organic substance and the sand or sandy soil on the surface of the desert or desertified land to form a modified sand layer on the surface of the desert or desertified land;

wherein the steps are performed in the order of Step a), Step b) and Step c); or in the order of Step a) and Step b) firstly and simultaneously, and then Step c); or in the order of Step a) firstly, and then Step b) and Step c) simultaneously; or in the order of Step b) firstly, and then Step a) and Step c) simultaneously; or Step a), Step b) and Step c) simultaneously.

The method for treating sand or sandy soil in desert or desertified land in this invention can also be implemented in the following steps (hereinafter referred to as M2):

a) dissolving a solid organic substance into water to form an adhesive and cohesive aqueous solution of the solid organic substance;

b) spreading the solution of the solid organic substance in Step a) onto the surface of the desert or desertified land;

c) stirring the solution of the solid organic substance with the sand or sandy soil on the surface of desert or desertified land to form a modified sand layer on the surface of the desert or desertified land;

wherein the steps are performed in the order of Step a), Step b) and Step c); or in the order of Step a) firstly, and then Step b) and Step c) simultaneously; or in the order of Step a) and Step b) firstly and simultaneously, and then Step c); or Step a), Step b) and Step c) simultaneously.

Step a) in both M1 and M2 can be conducted in manual mode, mechanical mode, or a combination thereof; Step b) in both M1 and M2 is conducted in manual mode, mechanical mode, or a combination thereof; and Step c) in both M1 and M2 is conducted in manual mode, mechanical mode, or a combination thereof.

The stirring of Step c) in both M1 and M2 is conducted by a device with an external stirring module in walking mode on the surface of desert or desertified land.

In M1, Step a) is conducted by a device with a spraying module in walking mode or by an irrigation system on the surface of desert or desertified land; and Step b) is conducted in walking mode by a device with a module capable of spreading out the solid organic substance on the surface of desert or desertified land.

Step b) in both M1 and M2 is conducted in walking mode by a device with a module capable of spreading out the solid organic substance on the surface of desert or desertified land.

The device with an external stirring module is a rotary cultivator.

The amount of water spread onto the surface of desert or desertified land is able to make the sand or sandy soil wet in an average depth of not less than 2 cm.

The method further comprises a step of fertilizing the sand or sandy soil of desert or desertified land, wherein the fertilizing is conducted together with at least one of the above three steps a), b) and c) in both M1 and M2, or separately.

The method further comprises a step of sowing seeds in sand or sandy soil of desert or desertified land, wherein the sowing is conducted together with at least one of the above three steps a), b) and c) in both M1 and M2, or separately.

The stirring conducted by a device with an external stirring module in walking mode on the surface of desert or desertified land shall be conducted at least once.

The surface of desert or desertified land may be levelled prior to Step a) in both M1 and M2.

In this invention, manual mode, mechanical mode, or a combination thereof can be used to treat the surface layer of sand or sandy soil in desert or desertified land to form a modified sand material as described in Chinese patents "Modified Sand Material" (ZL 201310223390.4), "Method for Producing Modified Sand Material" (ZL 201310224659.0) and "Method for Treating Sandy Soil by Modified Sand material" (ZL 201310224654.8). The method of this invention can be directly implemented on the surface of desert or desertified land. In addition, the stirring procedure on the surface of desert or desertified land can also be regarded as a cultivating step for the modified sand or sandy soil to facilitate the subsequent sowing and planting operations so as to provide a good habitat for plants to grow.

The surface of desert or desertified land in this invention refers to both the natural surface and the treated surface of desert or desertified land. The purpose of surface leveling of desert or desertified land is to facilitate the soilization procedure of sand or sandy soil. Where the original ground surface of desert or desertified land is not level enough due to wind erosion, manual or mechanical means might be applied to level the surface of desert or desertified land by loosening, grading or compaction to facilitate the soilization procedure on it later. The leveled surface of desert or desertified land might have a gradient.

In this invention, the solid organic substance can be dissolved into water to form an adhesive and cohesive solution. The adhesive and cohesive solution, after being mixed with sand or sandy soil, can bind the sand or sandy soil granules together: after the evaporation of the water in the adhesive and cohesive solution, the water-soluble solid organic substance among the sand or sandy soil can bind together the sand or sandy soil granules, and can dissolve into water again when it encounters water, and thus forms the adhesive and cohesive solution again that exists among the sand or sandy soil granules. The water-soluble solid organic substance comprises at least one of natural polymer, modified natural polymer and synthetic polymer. At least one of natural polymer, modified natural polymer and synthetic polymer material which can disperse into the solution can be further added into the solution, and at least one of organic macromolecular additive, small molecule additive, surfactant, inorganic reactive powder/particulate substance, inorganic non-reactive powder/particulate substance, solid substance and pH adjusting agent can be further added into the solution.

In this invention, when steps a), b) and c) in both M1 and M2 are implemented by manual labor, it can be conducted in the order of Step a), Step b) and Step c); or Step a) and Step b) firstly and simultaneously, and then Step c); or Step a) firstly, and then Step b) and Step c) simultaneously; or Step b) firstly, and then Step a) and Step c) simultaneously; or steps a), b) and c) simultaneously.

In this invention, "simultaneously" refers to the simultaneous implementation of two or more steps within a short time without considering which step is done first. To ensure the satisfying result of this invention, after the completion of the three steps, the water spread onto the surface of the desert or desertified land or the water in the adhesive and cohesive solution of the solid organic substance shall be mainly kept in the surface layer of sand or sandy soil.

In this invention, when steps a), b) and c) are implemented by mechanical equipment, steps a), b) and c) can be conducted separately one step after another by different machines; or steps a), b) and c) can be conducted by one machine integrated with all the required functions one step after another or simultaneously.

In this invention, the water-spraying device can be a vehicle with water-spraying capacity or an irrigating facility for agricultural use. The device with the capacity to spread the solid organic substance might be a fertilizer spreader, seeder, feeding machine etc.

When the soilization procedure is implemented by mechanical means, to reach the purpose of this invention and to facilitate the subsequent sowing and planting operations in the soilized sand or sandy soil, the mechanical equipment might be installed with one or more auxiliary devices for ground leveling, seeding, fertilizing, insecticide spraying etc.

As the purpose of this invention is to soilize the surface layer of the sand or sandy soil in desert or desertified land, making it a favorable habitat for plants, the soilization process in manual or mechanical mode, or a combination thereof may be accompanied with one or more operations such as fertilizing and sowing in order to provide necessary conditions for the growth of plant.

In this invention, the mechanical device with an external stirring module can be a rotary cultivator. The rotary cultivator rotates and mixes sand or sandy soil in desert or desertified land by its spades to form a uniform mixture of the sand or sandy soil, water and organic matter and thus to provide a good habitat for seeding and planting. The rotary cultivator utilized to implement this invention is low in cost and desirable in mixing effect.

The mechanical equipment for this invention is not limited to rotary cultivator, which can be any mechanical device or a combination of mechanical devices with the following functions: 1) spreading the solid organic substance onto the surface of desert or desertified land in a uniform matter; 2) spreading water (or a liquid with water as the main component) onto the surface of desert or desertified land in a uniform manner; 3) mixing water, the solid organic substance and the surface layer of sand in desert or desertified land in a uniform manner, and also when necessary it can be installed with one or more auxiliary devices for ground leveling, seeding, insecticide spraying etc. This invention can also be implemented by only one machine integrated with the functions of spreading water and the solid organic substance in a uniform matter, and then mixing with sand or sandy soil on the surface of desert or desertified land by one or more operations.

By manual or mechanical mode, or a combination thereof, the adhesive and cohesive solution after mixed with sand or sandy soil can bind the sand granules to form a modified sand material with a porous structure. The water in the adhesive and cohesive solution is reserved between the sand or sandy soil granules; after the evaporation of the water in the adhesive and cohesive solution, the water-soluble solid organic substance among the sand or sandy soil can bind together the sand or sandy soil granules, and can dissolve into water again when it encounters water, and thus forms the adhesive and cohesive solution again among the sand or sandy soil granules. The modified (soilized) sand or sandy soil in desert or desertified land possesses the properties of the natural soil. The whole soilization process is simple and efficient. The sand or sandy soil in desert or desertified land can be soilized directly without the conventional transporting and paving procedure after soilizing and thus saving cost and time; in addition, the mixing procedure on the surface of desert or desertified land can also be regarded as a cultivating step for the soilized sand or sandy soil to facilitate subsequent sowing and planting operations to provide a good habitat for plants.

The advantage of this invention is that the modified sand material as described in Chinese patents "Modified Sand Material" (ZL 2013102233"90.4), "Method for Producing Modified Sand Material" (ZL 201310224659.0) and "Method for Treating Sandy Soil by Modified Sand material" (ZL 201310224654.8) can be directly obtained, through manual or mechanical mode, or a combination thereof, by firstly spreading in any order water and the solid organic substance onto the surface of desert or desertified land, or directly spreading the adhesive and cohesive solution containing the solid organic substance onto the surface of desert or desertified land, and then mixing water and the solid organic substance or the solution thereof with sand in a uniform manner.

This invention is basically different from the traditional agronomical operations of cultivating, seeding, fertilizing, weeding, harvesting and irrigating.

Rotary cultivators are used in traditional soil cultivation, too, but the purpose is to loosen the soil. Seeding is to embed the seeds into the soil in a designated depth and spacing. Fertilizing is to supplement nutrients to the natural soil when it cannot provide enough nutrition for plants. Weeding is to take out weeds by manual labor or mechanical equipment in order to provide a favorable condition for the crops to grow. When the natural precipitation is insufficient or unevenly distributed and crops do not have enough water, irrigating is needed to provide water for the crops to grow for a good harvest.

The above cultivating, seeding, fertilizing, weeding, harvesting and irrigating operations are for agriculture only, not for sand treatment, and the difference between the agronomical techniques and this invention lies in purpose, material used, effect, theoretical principle and object.

In terms of purpose, this invention is to soilize the surface layer of desert or desertified land to enable the sand or sandy soil to acquire the eco-mechanical attributes of soil, to change the interrelationship between the sand granules, and to form a porous structure with binding force (cohesive force) between the sand granules, so that the modified sand or sandy soil will possess the eco-mechanical attributes of natural soil and the capacities to retain water, nutrients and air, so as to provide a favorable habitat for plants to grow.

In terms of the material used, this invention uses a water-soluble solid organic substance. The solid organic substance can be dissolved in water to form an adhesive and cohesive solution. The adhesive and cohesive solution, after being mixed with sand or sandy soil, can bind the sand or sandy soil granules together, and thus forms a modified sand material with a porous structure; the water in the adhesive and cohesive solution is reserved between the sand or sandy soil granules with the solution; after the evaporation of the water in the adhesive and cohesive solution, the water-soluble solid organic substance among the sand or sandy soil can bind together the sand or sandy soil granules, and can dissolve into water again when it encounters water, and thus forms the adhesive and cohesive solution again that exists among the sand or sandy soil granules.

In this invention after the solid organic substance is dissolved into water and then mixed with sand or sandy soil, the ODI constraint will form among the modified sand or sandy soil granules to enable readily transition between the rheological state and the solid state, and thus to possess the mechanical properties and consequently the eco-mechanical attributes of self-repair and self-regulation of natural soil.

In terms of theoretical principle, this invention is based on the theory of granular constraint proposed by the applicant. The modified sand or sandy soil will turn from the discrete state into the rheological state which has the same mechanical property as natural soil after the "binding constraint" (ODI constraint provided by the solution of the solid organic substance) forms among the sand granules. When the water in the "binding constraint" evaporates, the "binding constraint" will turn into the "fixed constraint" and the modified sand or sandy soil will turn from the rheological state into the solid state which has the same mechanical property as the dry soil. When the modified sand or sandy soil absorbs water again, it will turn back from the solid state into the rheological state. Therefore, the modified sand or sandy soil possesses the same steady mechanical properties as natural soil whether it is wet or dry. In addition, the mixture of sand or sandy soil, water and the solid organic substance is quite consistent in nature for its adhesiveness and cohesiveness remains. In terms of the capacities to retain water and nutrients, the modified sand or sandy soil formed by constraint and granules has a porous structure (either in dry or wet states) so it can freely exchange water, nutrients and air and the external environment, hence the modified sand or sandy soil is able to retain water and nutrients.

In terms of object, the above-mentioned agronomical techniques have not been applied to desert or desertified land usually hostile for the growth of plant, and this invention aims to use them to modify the sand or sandy soil in desert or desertified land.

In terms of effect, the planting experiments in the soilized sand or sandy soil have proved that any sand (including sandy soil with sand as the main component) can be soilized by imposing constraint in it and then becomes a favorable habitat for plants. The soilized sand or sandy soil can keep its ecological and eco-mechanical attributes year after year, which shows that the "binding constraint" formed by the superpolymer can be retained among the sand granules. Once plants grow out in the soilized sand or sandy soil, better protection will be formed by the roots together with the binding constraint, and furthermore when the roots, stems and leaves of plants are decomposed the viscous solution will act as a kind of "binding constraint" in mechanics to enhance the soilizing effect. Experiments have verified that rainstorm will not wash away the binding constraint among the sand granules; on the contrary, lots of algae grow out on the "soil" surface to form a protective layer for the constraint within. Thus, a new ecological system is formed, and as time goes by the soilized sand or sandy soil is becoming more fertile and exhibits even better soil properties.

The theoretical principle, purpose and object of this invention determine that steps a), b) and c) in both M1 and M2 are closely interrelated and indispensable with each other. Only after the three steps are completed, the soilization is achieved.

The ultimate purpose of this invention is to turn sand or sandy soil in desert or desertified land into a favorable habitat for the growth of plant. Thus, during or after the process of soilization, seeding or fertilizing operations might be conducted so that plants will grow in the modified sand or sandy soil soon. Although the seeding and fertilizing operations are not a part of this invention, but they are necessary for the growth of plant after the steps in this invention are completed.

This invention can soilize sand or sandy soil in desert or desertified land.

In all, this invention is in essence different from the traditional agronomical techniques of cultivating, fertilizing, seeding, weeding, harvesting and irrigating operations used for the natural soil.

This invention is also different from the prevailing sand control methods.

In the prevailing sand control methods, the vegetation method is to grow plants in desert or desertified land in order to improve the natural environment; the engineering method is to mechanically slow down the wind speed so as to temporally curb sand drifting; the chemical method is to spray a chemical substance onto the desert surface to glue together the surface layer of sand by infiltration of the chemical substance to form a protective coating or layer on the desert surface so that sand will not be easily blown away by wind. In summary, the vegetation method is to plant trees; the engineering method is to disrupt sand drifting and the chemical method is to form a hard, protective sand coating or layer (in a solid state), which cannot return to the rheological state.

In this invention, a designated "soil" layer with certain thickness is formed on the surface of desert or desertified land by mixing sand, water and the solid organic substance. This invention has successfully soilized sand or sandy soil by mixing sand or sandy soil, water and the organic substance in a uniform manner to form a favorable habitat for plants to grow, so two purposes are reached: sand fixing and the growth of plant. Comparing with vegetation method for sand control which does not change the properties of sand, while this invention changes the nature of the habitat of plants and makes it favorable for the growth of plant. In comparison with the engineering method, instead of slowing down the wind speed to curb sand drifting, this invention prevents sand from drifting by changing the nature of sand or sandy soil once and for all. In contrast with the chemical method which only fixes the surface layer of desert or desertified land by forming an irrecoverable, hard sand layer, this invention turns the surface layer of sand or sandy soil in desert or desertified land into "soil" with the mechanical and ecological attributes of natural soil.

In all, this invention, which can rapidly soilize the surface layer of sand or sandy soil in desert or desertified land, making it a favorable habitat for plants, is different from the conventional sand control methods, and is also different from the traditional agronomical operations in essence.

DETAILED DESCRIPTION

An example of the method for treating (soilizing) sand or sandy soil in desert or desertified land comprises the following steps (M1):
  a) spreading water onto the surface of the desert or desertified land;
  b) spreading a solid organic substance onto the surface of the desert or desertified land;
  c) stirring water, the solid organic substance and the sand or sandy soil on the surface of the desert or desertified land to form a modified sand layer on the surface of the desert or desertified land; wherein
  the solid organic substance is dissolved in water to form an adhesive and cohesive solution; the adhesive and cohesive solution, after being mixed with sand or sandy soil, can bind the sand or sandy soil granules together; after the evaporation of the water in the adhesive and cohesive solution, the water-soluble solid organic substance among the sand or sandy soil can bind together the sand or sandy soil granules, and can dissolve into water again when it encounters water, and thus forms the adhesive and cohesive solution again that exists among the sand or sandy soil granules.

In this example, the method is conducted in the order of Step a), Step b) and Step c). The water and the solid organic substance in Step a) and Step b) are spread in the proportion in compliance with the Chinese patents "Modified Sand Material" (ZL 2013102233"90.4), "Method for Producing Modified Sand Material" (ZL 201310224659.0) and "Method for Treating Sandy Soil by Modified Sand material" (ZL 201310224654.8) to form a satisfying modified layer of sand or sandy soil.

The steps are conducted in the order of Step a), Step b) and Step c); or Step a) and Step b) firstly and simultaneously, and then Step c); or Step a) firstly, and then Step b) and Step c) simultaneously, or Step b) firstly, and then Step a) and Step c) simultaneously; or steps a), b) and c) simultaneously.

Different embodiments may be applied to different environmental conditions of desert or desertified land. For instance, when the wind is quite strong, it is better to conduct Step b) and Step c) simultaneously.

The ultimate purpose of this invention is to form a modified sand material as described in Chinese patents "Modified Sand Material" (ZL 2013102233"90.4), "Method for Producing Modified Sand Material" (ZL 201310224659.0) and "Method for Treating Sandy Soil by Modified Sand material" (ZL 201310224654.8), so the implementation procedure can also follow the steps below:
 a) dissolving a solid organic substance into water to form an adhesive and cohesive aqueous solution of the solid organic substance;
 b) spreading the solution of the solid organic substance in Step a) onto the surface of the desert or desertified land;
 c) stirring the solution of the solid organic substance with the sand or sandy soil on the surface of desert or desertified land to form a modified sand layer on the surface of the desert or desertified land:
 wherein the steps are performed in the order of Step a), Step b) and Step c); or in the order of Step a) firstly, and then Step b) and Step c) simultaneously; or in the order of Step a) and Step b) firstly and simultaneously, and then Step c); or Step a), Step b) and Step c) simultaneously.

All these procedures can achieve the purpose of this invention.

The solid organic substance can be dissolved in water to form an adhesive and cohesive solution; the adhesive and cohesive solution, after being mixed with sand or sandy soil, can bind the sand or sandy soil granules together; after the evaporation of the water in the adhesive and cohesive solution, the water-soluble solid organic substance among the sand or sandy soil can bind together the sand or sandy soil granules, and can dissolve into water again when it encounters water, and thus forms the adhesive and cohesive solution again that exists among the sand or sandy soil granules The surface of desert or desertified land in this invention refers to both the natural surface and the treated surface of desert or desertified land. The purpose of surface leveling of desert or desertified land is to facilitate the soilization procedure of sand or sandy soil. Where the original ground surface of desert or desertified land is not level enough due to wind erosion, manual or mechanical means might be applied to level the surface of desert or desertified land by loosening, grading or compaction to facilitate the soilization procedure on it later. The leveled surface of desert or desertified land might have a gradient.

In this embodiment, Step a) can be conducted in manual mode, mechanical mode, or a combination thereof; Step b) can be conducted in manual mode, mechanical mode, or a combination thereof; Step c) can be conducted in manual mode, mechanical mode, or a combination thereof.

In this embodiment, manual or mechanical mode, or a combination thereof can be used to spread in any order water and the organic matter or directly spread the adhesive and cohesive solution dissolved from the solid organic substance onto the surface of desert or desertified land, and then mix water and the organic substance or the solution containing the organic substance with sand on the surface of desert or desertified land in a uniform matter to form a modified sand material as the Chinese patents of "Modified Sand Material" (ZL 201310223390.4), "Method for Producing Modified Sand Material" (ZL 201310224659.0) and "Method for Treating Sandy Soil by Modified Sand material" (ZL 201310224654.8). This sand treatment method can be directly implemented on the surface of desert or desertified land. In addition, the mixing procedure on desert or desertified land can also be regarded as a cultivating step for the soilized sand or sandy soil to facilitate sowing and planting in it later so as to provide a good habitat for plants.

In this embodiment, Step c) is conducted in walking mode by a device with an external stirring module, advancing while mixing on the surface of desert or desertified land; the device with an external stirring module includes rotary cultivator, road construction equipment with a mixing device, etc.

In this embodiment, the device with an external stirring module refers to rotary cultivator. The rotary cultivator utilizes its spades to rotate and mix sand or sandy soil in desert or desertified land to form a uniform mixture of sand or sandy soil, water and the solid organic substance so as to provide a good condition for seeding and planting in it later. The rotary cultivator utilized to implement this invention is low in cost and desirable in mixing effect.

The mechanical equipment for this embodiment can be any mechanical device or a combination of mechanical devices with the following functions: 1) spreading the solid organic substance onto the surface of desert or desertified land in a uniform matter; 2) spreading water (or a liquid with water as the main component) onto the surface of desert or desertified land in a uniform manner; 3) mixing water, the solid organic substance and the surface layer of sand in desert or desertified land in a uniform manner, and also when necessary it can be installed with one or more auxiliary devices for ground leveling, seeding, insecticide spraying etc. This invention can also be implemented by only one machine integrated with the functions of spreading water and the solid organic substance in a uniform matter, and then mixing with sand or sandy soil on the surface of desert or desertified land by one or more operations.

In this embodiment, the three steps of a), b), and c) in this invention can be conducted by different machines with the desired function or functions, or conducted by other machines integrated with two or all the three functions. The mechanical equipment might operate repeatedly to implement the steps in this invention. Each step in this invention must be conducted no less than once to realize the purpose of this invention. In addition, to facilitate subsequent sowing and planting after soilization, the mechanical equipment in this invention can be installed with one or more devices with the capacities such as leveling, seeding and fertilizing.

In this embodiment, Step a) is conducted in walking mode by a water-spraying device spreading water on the surface of desert or desertified land, and it can also be conducted by an irrigation system for agricultural use; Step b) is conducted by a device with the capacity to spread the solid organic substance, advancing while spreading on the surface of desert or desertified land.

In this embodiment, Step b) is conducted by a device with spreading capacity, advancing while spreading on the surface of desert or desertified land; the spreading device refers to a device able to spread the solution containing the solid organic substance onto the surface of desert or desertified land which is similar to a water-spraying vehicle or other devices with the capacity to pump out the solution onto the surface of desert or desertified land like the irrigation system.

In this embodiment, any one, two or all three steps of a), b) and c) can be implemented by one or more machines with such capacities separately or together (i.e., the three steps can be implemented by one or more machines without affecting the scope of interest of this invention) but each step must be conducted no less than once. When steps a), b) and c) are conducted by different machines individually, the machines shall be well coordinated to ensure each step is conducted adequately to soilize the surface layer of desert or desertified land. Similarly, any two steps might be implemented by one machine integrated with the required functions and then the second machine will complete the last step in order to soilize the surface of desert or desertified land. Similarly, all the three steps in this embodiment might be completed by one machine to soilize the surface of desert or desertified land, but each step must be conducted no less than once.

The mechanical device for spreading water onto the surface of desert or desertified land may be a water-spraying vehicle, asphalt-spraying machine, and the like. The facility to spread the solid organic substance onto the surface of desert or desertified land might be a spreading machine with the capacity to spread the solid organic substance onto the surface of desert or desertified land in a uniform manner, and it can also be a seeder or broadcaster with the capacity to spread the solid organic substance in the designated depth of desert or desertified land in a uniform manner. The facility for mixing water, the solid organic substance and sand might be a rotary cultivator, and it can also be other machines with the capacity to advance in desert, collect sand, mix with the solid organic substance and then spread the mixture onto the surface of desert or desertified land. The step of dissolving the solid organic substance into water can be conducted by a disperser, mixer, and the like. The solution containing the solid organic substance can be spread by a water-spraying vehicle, asphalt spraying machine etc.

In this embodiment, the amount of water spread onto the surface of desert or desertified land must be able to make the surface layer of sand wet in an average depth of no less than 2 cm, in a specific condition, 20-60 cm in depth, to realize the purpose of this invention. If water is infiltrated into the deeper layer of the sand or sandy soil, the purpose of this invention can be realized, too. A proper layer of wet sand will not only help soilize the surface layer of desert or desertified land for providing a favorable habitat for the growth of plant, but also reduce the cost.

In this embodiment, the fertilizing operation for the surface layer of desert or desertified land might be incorporated into at least one of the three steps in this invention or conducted independently. Fertilizing of the surface layer of desert or desertified land might be conducted by a conventional fertilizing machine for agricultural use prior to steps a), b) and c), or together with any one of the three steps. After mixing, the fertilizer shall be evenly distributed in the modified sand or sandy soil. For instance, solid fertilizer can be blended with the solid organic substance first and then spread onto the surface of desert or desertified land for more efficient treatment of desert or desertified land.

In this embodiment, the sowing operation may be conducted together with at least one of the three steps or independently. Any conventional seeding machine for agricultural use can be used to sow in the soilized sand or sandy soil. Sowing can also be incorporated within one of the three steps in this invention. The sowing operation is advised to be conducted after the mixing operation (Step c)) is completed in order to prevent the seeds from being damaged by mixing devices.

In this embodiment, the stirring operation by a device with an external stirring module in walking mode must be conducted at least once to ensure uniform mixing so as to form a satisfying modified sand material.

In this embodiment, prior to Step a), the surface of desert or desertified land may be leveled first. The leveling operation can be conducted by rotary cultivators, scrapers or plowing machines and the like to form a level surface in desert or desertified land to realize the purpose of this invention. Leveling refers to large-scale leveling and the leveled surface might have a gradient.

The difference between conducting steps a), b) and c) in different orders in this invention only lies in the order of adding water and the solid organic substance for the subsequent stirring operation, and the final result is the same. The choice of order depends on the specific environmental conditions.

Lastly, it is necessary to point out that the above embodiments are just some of the embodiments to realize this invention. It shall be noted that this invention is well-exemplified in the above embodiments, but one ordinary skill in the art can make various modifications and changes to the present disclosure without departing from the spirit and scope of the present, and the various modifications and changes are within the scope of this invention.

The invention claimed is:

1. A method for treating sand or sandy soil in desert or desertified land, comprising the following steps:
   a) spreading water onto the surface of the desert or desertified land;
   b) spreading a solid organic substance onto the surface of the desert or desertified land, wherein the solid organic substance contains at least one or two of polyvinyl alcohol, polyoxyethylene, polyethylene glycol, sodium polyacrylate, sodium carboxymethyl cellulose, hydroxypropyl methyl cellulose, cellulose ether, and a copolymer thereof;
   c) homogenously mixing water, the solid organic substance, and the sand or sandy soil on the surface of the desert or desertified land to form a modified sand layer on the surface of the desert or desertified land;
   wherein the steps are performed in the order of Step a), Step b), and Step c); or
      in the order of Step a) and Step b) firstly and simultaneously, and then Step c); or
      in the order of Step a) firstly, and then Step b) and Step c) simultaneously; or
      in the order of Step b) firstly, and then Step a) and Step c) simultaneously; or
      Step a), Step b), and Step c) simultaneously,
   wherein in Step c), the stirring is conducted by a device with an external stirring module in walking mode on the surface of the desert or desertified land, wherein the device with an external stirring module is a rotary cultivator,
   wherein the amount of water spread onto the surface of the desert or desertified land is able to make the sand or sandy soil wet in an average depth of not less than 2 cm.

2. The method for treating sand or sandy soil in desert or desertified land according to claim 1, wherein Step a) is conducted in manual mode, mechanical mode, or a combination thereof; Step b) is conducted in manual mode, mechanical mode, or a combination thereof; and Step c) is conducted in manual mode, mechanical mode, or a combination thereof.

3. The method for treating sand or sandy soil in desert or desertified land according to claim 1, wherein in Step a), the spreading of water is conducted by a device with a spraying module in walking mode or by an irrigation system on the surface of desert or desertified land; and in Step b), the spreading onto the surface of the desert or desertified land is conducted in walking mode by a device with a module capable of spreading out the solid organic substance.

4. The method for treating sand or sandy soil in desert or desertified land according to claim 1, further comprising fertilizing the surface of the desert or desertified land, wherein the fertilizing is conducted together with at least one of steps a), b), and c), or separately.

5. The method for treating sand or sandy soil in desert or desertified land according to claim 1, further comprising sowing seeds in sand or sandy soil of the desert or desertified land, wherein the sowing is conducted together with at least one of steps a), b), and c), or separately.

6. The method for treating sand or sandy soil in desert or desertified land according to claim 1, wherein the stirring by a device with an external stirring module in walking mode is conducted at least once.

7. The method for treating sand or sandy soil in desert or desertified land according to claim 1, further comprising prior to Step a), leveling the surface of the desert or desertified land.

* * * * *